(12) United States Patent
Sergyeyenko et al.

(10) Patent No.: US 7,111,406 B2
(45) Date of Patent: Sep. 26, 2006

(54) LASER CALIBRATION APPARATUS AND METHOD

(75) Inventors: Oleksiy P Sergyeyenko, Brockville (CA); James D Marshall, Mallorytown (CA); Robert D Watters, Ottawa (CA); Marcus W Bosch, Ottawa (CA); Rod Muir, South Mountain (CA)

(73) Assignee: Black & Decker Inc., Newark, DE (US)

( * ) Notice: Subject to any disclaimer, the term of this patent is extended or adjusted under 35 U.S.C. 154(b) by 44 days.

(21) Appl. No.: 11/055,384

(22) Filed: Feb. 10, 2005

(65) Prior Publication Data

US 2005/0193577 A1  Sep. 8, 2005

Related U.S. Application Data

(60) Provisional application No. 60/544,977, filed on Feb. 13, 2004.

(51) Int. Cl.
*G01C 5/02* (2006.01)
*G01C 9/14* (2006.01)

(52) U.S. Cl. .................. 33/291; 33/398; 33/DIG. 21

(58) Field of Classification Search ............ 33/286, 33/290, 291, 292, 391, 398, DIG. 21
See application file for complete search history.

(56) References Cited

U.S. PATENT DOCUMENTS

| | | | | |
|---|---|---|---|---|
| 4,751,782 A | * | 6/1988 | Ammann | 33/291 |
| 5,212,889 A | * | 5/1993 | Lysen | 33/286 |
| 5,539,990 A | * | 7/1996 | Le | 33/286 |
| 5,782,002 A | * | 7/1998 | Reed | 33/283 |
| 5,836,081 A | * | 11/1998 | Orosz, Jr. | 33/290 |
| 6,922,901 B1 | * | 8/2005 | Chou et al. | 33/290 |
| 2002/0088129 A1 | * | 7/2002 | Huang et al. | 33/286 |
| 2002/0092185 A1 | * | 7/2002 | Wu | 33/281 |
| 2003/0000094 A1 | * | 1/2003 | Tamamura | 33/286 |
| 2003/0101605 A1 | * | 6/2003 | Tacklind et al. | 33/286 |
| 2004/0172836 A1 | * | 9/2004 | Ng et al. | 33/286 |
| 2005/0172503 A1 | * | 8/2005 | Kumagai et al. | 33/290 |

* cited by examiner

Primary Examiner—G. Bradley Bennett
(74) Attorney, Agent, or Firm—Harness, Dickey & Pierce, P.L.C.

(57) ABSTRACT

A laser calibration device includes a housing and a pendulum pivotally coupled to the housing and suspending downwards therefrom. A laser deck is mounted to the pendulum. At least one laser for emitting a laser line is mounted to the laser deck. The laser includes a laser barrel rotatable within a barrel holder and a laser lens pivotally coupled to the laser barrel. A first adjustment mechanism is mounted between the laser deck and the laser for adjusting pitch. A second adjustment mechanism is mounted between the barrel holder and the laser barrel for adjusting roll. A third adjustment mechanism is mounted between the laser barrel and the laser lens for adjusting crowning. A fourth adjustment mechanism mounted to the pendulum for adjusting a center of gravity of the pendulum.

14 Claims, 4 Drawing Sheets

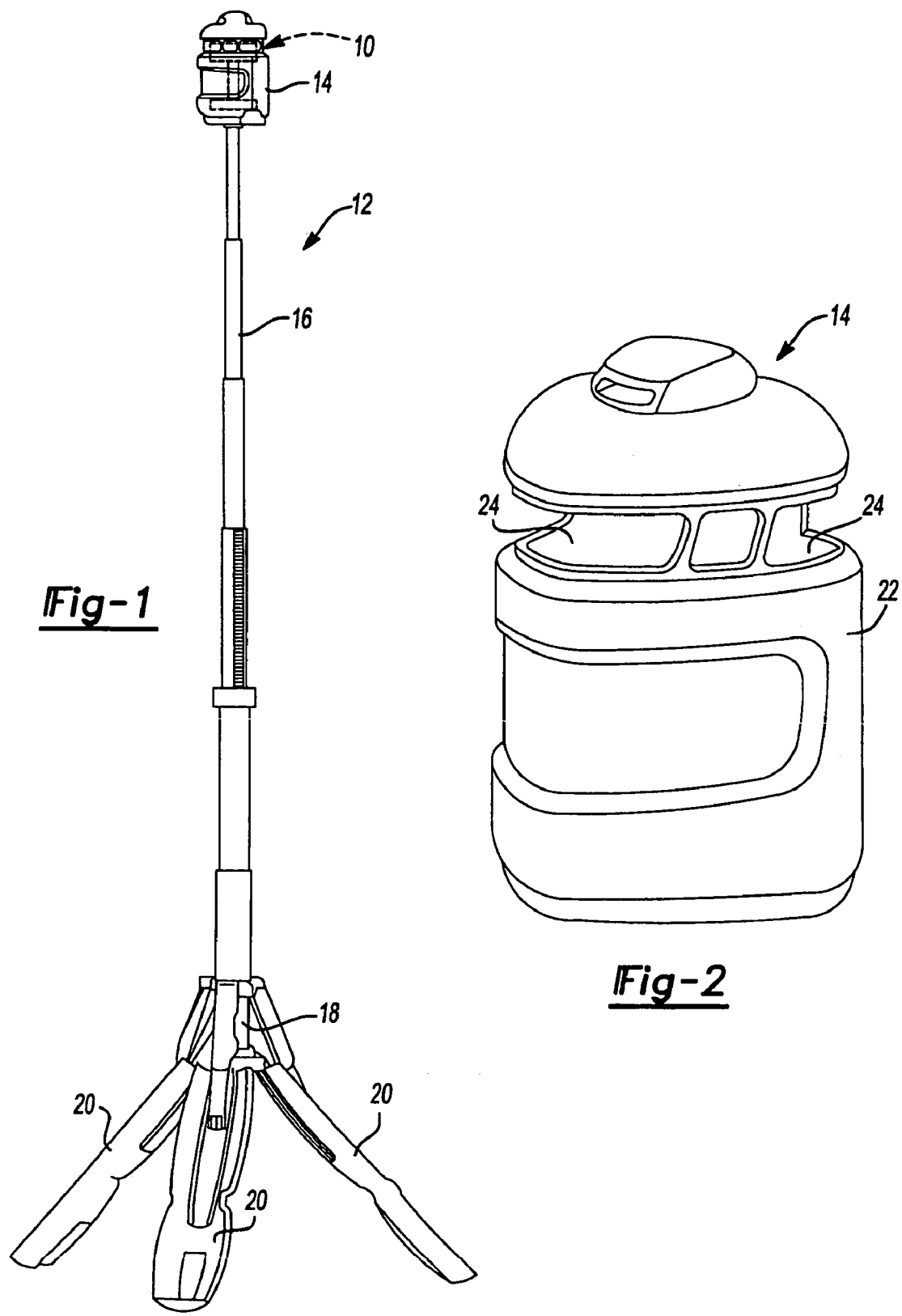

US 7,111,406 B2

LASER CALIBRATION APPARATUS AND METHOD

CROSS-REFERENCE TO RELATED APPLICATIONS

This application claims the benefit of U.S. Provisional Application No. 60/544,977, filed on Feb. 13, 2004. The disclosure of the above application is incorporated herein by reference.

FIELD OF THE INVENTION

The present invention relates to a laser calibration apparatus and method, and more particularly to a laser calibration apparatus and method for a tripod and laser head assembly.

BACKGROUND OF THE INVENTION

A tripod and laser head assembly provides a stable platform for an arrangement of laser diodes to project a number of laser lines therefrom. The lasers can have numerous uses, from surveying to leveling. In the case of leveling, the laser light beam is projected onto the surface of an object in order to provide a perfectly horizontal line thereon. For example, a laser leveler may be employed to hang pictures on a wall evenly, level a joist or beam during construction, or for marking a line.

Typically, a laser leveler has but a single laser source that projects a single horizontal light beam outwards. Depending on the distance from the laser source to the surface of the object that the light beam is being projected onto, a single laser source can only provide an arc of laser light less than 180°. In practice, this results in a horizontal line projected on the surface of the object that is limited in length. In order to project a visible light line on a surface of an object without a limitation as to line length, for example projecting a continuous light beam on four walls in a square room, more than one laser source must be employed.

However, calibrating more than one laser source in a single device can be difficult. When leveling or calibrating a laser light beam, in order to provide a truly horizontal line, six adjustment factors must be considered. The first three adjustment factors include an X axis, a Y axis and a Z axis (corresponding to the three movement directions in space). The X, Y and Z directions may be calibrated by adjusting the height of the laser sources for the Z axis, and by using a pendulum to calibrate the X and Y axes. The next three factors of calibration include rotation about the X axis, i.e. roll, rotation about the Y axis, i.e. pitch, and rotation about the Z axis, i.e. yaw. When using a single light source, roll, pitch and yaw may be adjusted by simply adjusting various parts of the laser light source. However, when utilizing a plurality of light sources, adjusting the roll, pitch and yaw is more difficult.

Accordingly, the present invention seeks to provide a laser calibration apparatus useful for a plurality of laser light sources and a method of calibrating the plurality of laser light sources.

SUMMARY OF THE INVENTION

A laser calibration device includes a housing and a pendulum pivotally coupled to the housing and suspending downwards therefrom. A laser deck is mounted to the pendulum. At least one laser for emitting a laser line is mounted to the laser deck. The laser includes a laser barrel rotatable within a barrel holder and a laser lens pivotally coupled to the laser barrel. A first adjustment mechanism is mounted between the laser deck and the laser for pivoting the laser with respect to the laser deck to adjust a pitch of the laser line. A second adjustment mechanism is mounted between the barrel holder and the laser barrel to rotate the laser barrel with respect to the barrel holder to adjust a roll of the laser line. A third adjustment mechanism is mounted between the laser barrel and the laser lens to pivot the laser lens with respect to the laser barrel to adjust a crowning of the laser line. A fourth adjustment mechanism mounted to the pendulum for adjusting a center of gravity of the pendulum. The first, second, third, and fourth adjustment mechanisms are used to make horizontal the laser line emitted from the laser.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is an isometric view of an exemplary laser tripod assembly having a laser calibration apparatus constructed according to the principles of the present invention;

FIG. 2 is an isometric view of the housing of the laser calibration apparatus of the present invention;

DETAILED DESCRIPTION OF THE PREFERRED EMBODIMENTS

Figure 3:
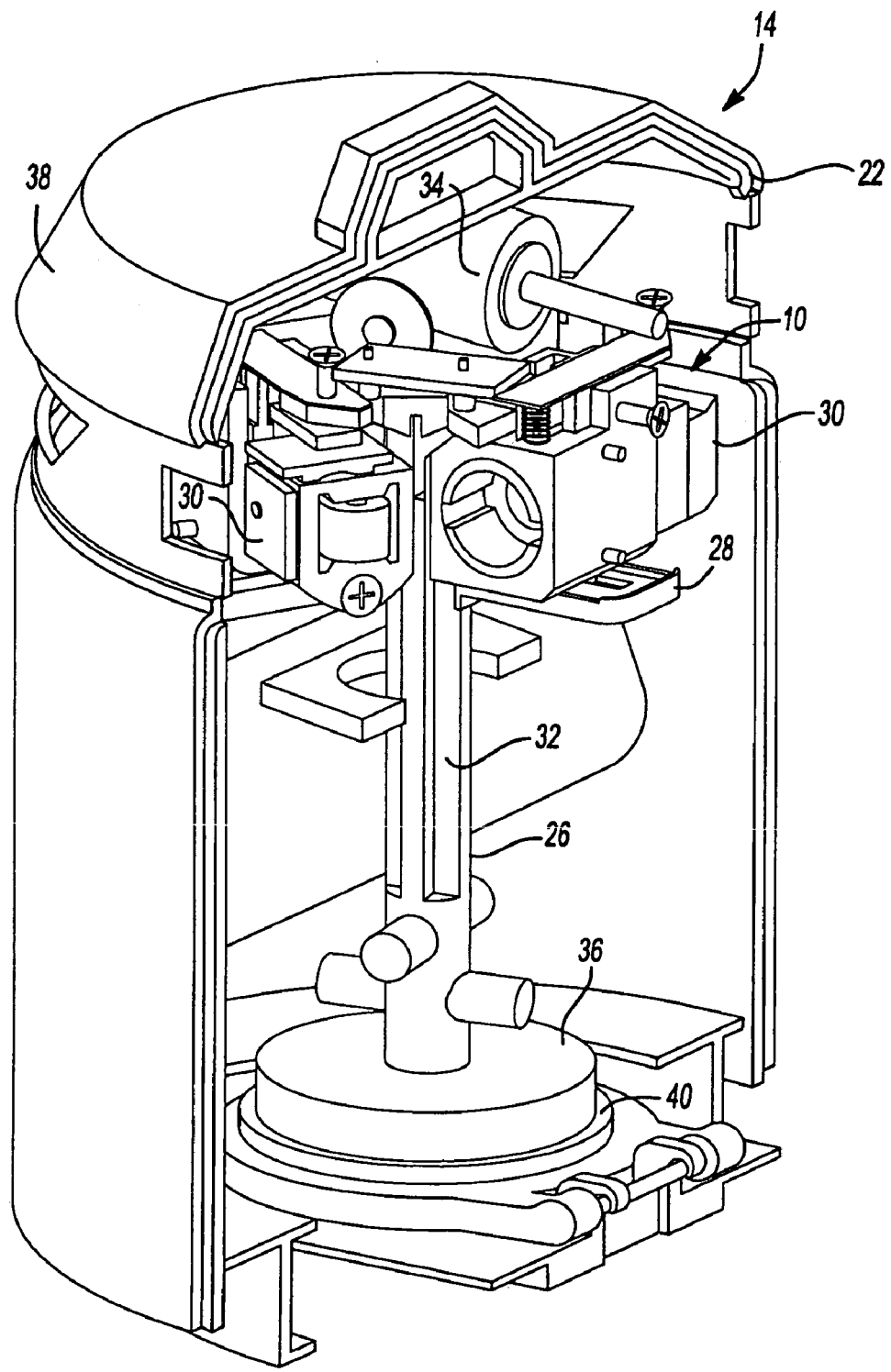
FIG. 3 is a cross-sectional view of the housing in FIG. 2 taken in the direction of arrow 3—3, illustrating the laser calibration apparatus of the present invention located therein.

The following description of the preferred embodiment(s) is merely exemplary in nature and is in no way intended to limit the invention, its application, or uses.

With reference to FIG. 1, a laser calibration apparatus 10 is illustrated in association with an exemplary laser tripod assembly 12. The laser calibration apparatus 10 and the associated method is used to calibrate a plurality of laser sources, as will be described in greater detail below, such that the laser tripod assembly 12 may be used to project a horizontal continuous laser line onto a given surface. The laser tripod assembly 12 generally includes a laser head 14 removably attached to an expandable neck 16 extending from a tripod base 18. The tripod base 18 includes a plurality of legs 20. A detailed description of this exemplary laser tripod assembly 12 may be found in commonly assigned co-pending application Ser. No. 10/979,953.

Turning now to FIG. 2, the laser head 14 includes a housing 22 used to protect the laser calibration apparatus 10 (FIG. 1) located therein. A plurality of windows 24 are formed in a top portion of the housing 22 to allow the laser sources located therein to emit laser beams from the laser head 14.

With reference to FIG. 3, the laser calibration apparatus 10 is illustrated in operative association with the laser head 14. The laser calibration apparatus 10 generally includes a pendulum 26, a laser deck 28 mounted to the pendulum 26 and a plurality of laser sources 30 mounted to the laser deck 28.

Figure 4:
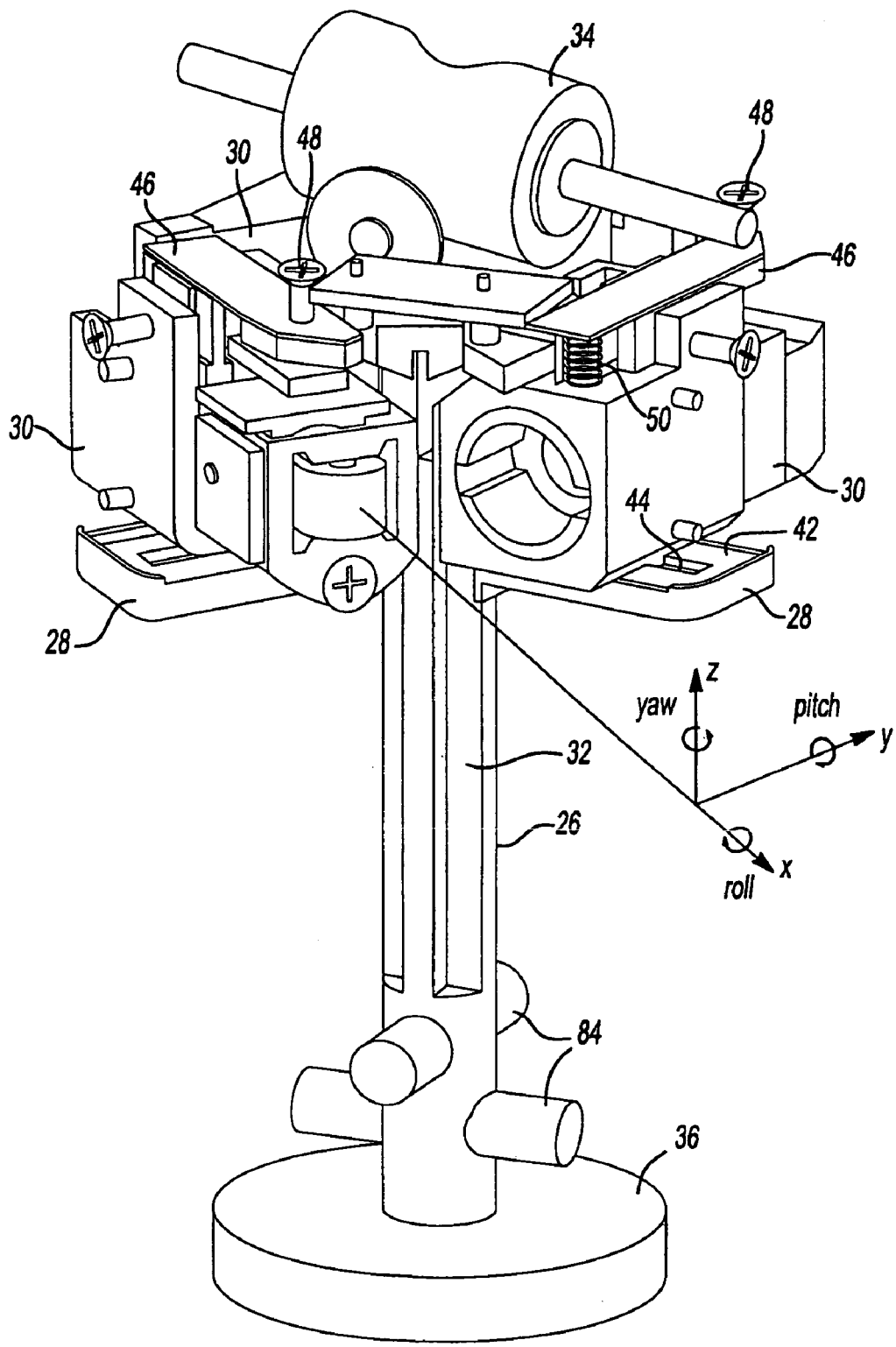
FIG. 4 is an isometric view of the laser calibration apparatus of the present invention.

The pendulum 26 includes a long shaft 32 extending between a pivot point 34 located at an end thereof and a weighted magnet 36, located at an opposite end of the shaft 32. The pivot point 34 is rotatably connected to a top portion 38 of the housing 22 in the laser head 14. The pivot point 34 allows the pendulum 26 to move in the X and Y directions (as indicated in FIG. 4). The weighted magnet 36 acts to keep the shaft 32 perpendicular to a perfectly horizontal line. The weighted magnet 36 engages a metal contact 40 mounted to the housing 22. The metal contact 40 may be moved by engaging a switch (not shown) such that the end of the pendulum 26 with the weighted magnet 36 may move freely. When the metal contact 40 is moved back into its engaged position (as shown in FIG. 3), the weighted magnet 36 engages the metal contact 40, thereby keeping the pendulum 26 from rotating about the pivot point 34. The metal contact 40 is used to keep the pendulum 26 from moving when the laser tripod assembly 12 is being transported, thereby preventing the laser calibration apparatus 10 from moving during transport.

With reference to FIG. 4, the laser deck 28 is mounted to the shaft 32 of the pendulum 26 near the pivot point 34. There is one laser deck 28 for each of the laser sources 30. In a particular example provided, there are three laser sources 30 and, accordingly, three laser decks 28 (only two of which are visible). However, fewer or more than three laser sources 30 and three laser decks 28 may be employed with the present invention. Each laser source 30 has a calibration position that is defined by six degrees of movement including an X axis, a Y axis, a Z axis, rotation about the X axis (roll), rotation about the Y axis (pitch), and rotation about the Z axis (yaw).

The laser deck 28 extends perpendicularly outward from the shaft 32. The laser deck 28 has a lower surface 42 with a groove 44 formed therein. As will be described in greater detail below, the groove 44 is used to allow a laser source 30 to pivot at that point, thereby adjusting pitch.

The laser deck 28 further includes a top surface 46 located above the laser source 30. The top surface 46 extends the length of the laser source 30 and is mounted to the pendulum 26. There is a top surface 46 for every laser source. 30. The top surface 46 includes a pitch screw 48 extending therethrough at one end of the top surface 46 and a biasing member 50 extending from the top surface 46 towards the laser source 30 at the opposite end of the top surface 46 from the pitch screw 48. As will described in greater detail below, the pitch screw 48 and the biasing member 50 act to adjust the pitch of the laser source 30.

Figure 5:
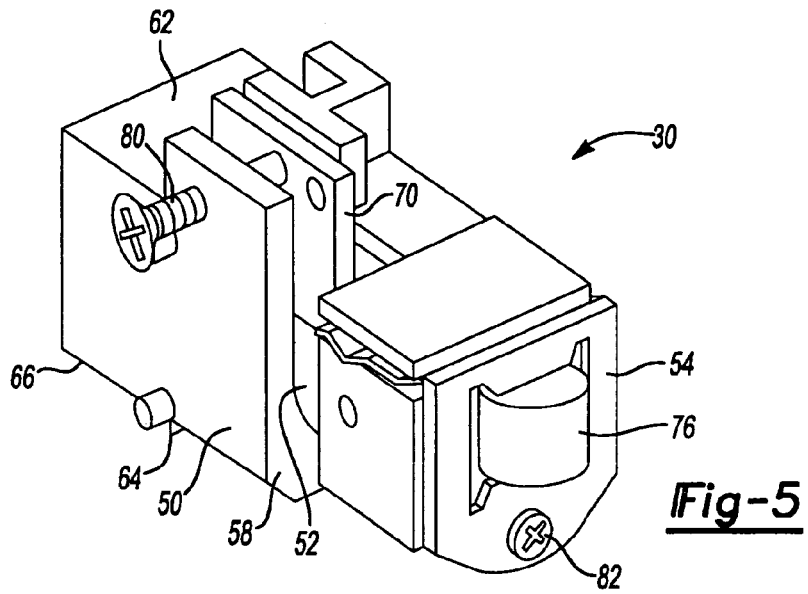
FIG. 5 is an isometric view of a single laser light source used in combination with the laser calibration apparatus of the present invention.
Figure 6:
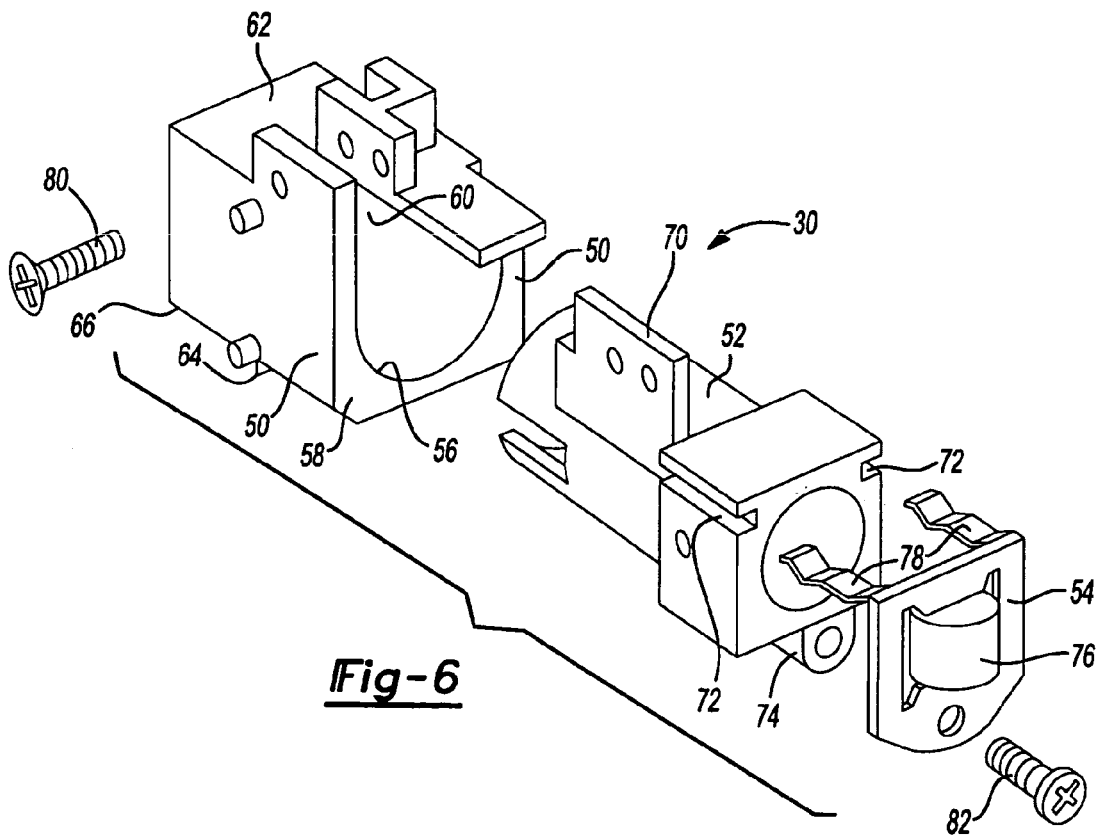
FIG. 6 is an isometric view of the single laser light source of FIG. 5 in a disassembled configuration.

Turning now to FIGS. 5 and 6, one of the laser sources 30 will now be described in greater detail. The laser source 30 includes a barrel holder 50, a laser barrel 52 and a lens holder 54. The barrel holder 50 includes an opening 56 sized to receive the laser barrel 52 therein. The opening 56 is formed on a front face 58 of the barrel holder 50. A slot 60 extends from the opening 56 onto a top surface 62 of the barrel holder 50. The slot 60 is sized to receive a portion 70 of the laser barrel 52, as will be described below. The barrel holder 50 also includes a rib 64 formed on a bottom surface 66 thereof. The rib 64 is sized to fit within the groove 44 (FIG. 4) of the laser deck 28.

The laser barrel 52 houses a laser diode (not shown) that generates the laser beam used in the invention. A vertical fin 70 extends up from the laser barrel 52. The vertical fin 70 is sized to fit within the slot 60 of the barrel holder 50 when the laser barrel 52 is inserted into the opening 56. The laser barrel 52 further includes a pair of grooves 72 and a screw mount 74 formed on an end of the laser barrel 52 for receiving portions of the lens holder 54.

Lens holder 54 includes a lens 76 mounted therein used to focus the laser beam generated from the laser diode (not shown) in the laser barrel 52. The lens holder 54 includes a pair of tabs 78 sized to fit within the groove 72 of the laser barrel 52. The tabs 78 secure the lens holder 54 onto the laser barrel 52.

The laser source 30 includes two adjustment devices used to calibrate the laser source 30 including a roll screw 80 and a crown screw 82. The roll screw 80 fits within screw holes formed in the barrel holder 50 and the vertical fin 70 of the laser barrel 52. As will be described below, adjusting the roll screw 80 in turn moves the fin 70 thereby adjusting the laser barrel 52 relative to the barrel holder 50. The crown screw 82 fits within screw holes in the lens holder 54 and the screw mount 74 of the laser barrel 52. As will be described below, adjusting the crown screw 82 adjusts the crowning effect of the laser emitted through the lens 76 of the lens holder 54.

With general reference to FIGS. 4, 5, and 6, the calibration of the laser calibration apparatus 10 will now be described. First, one of the laser sources 30 is selected and activated such that a laser beam is being emitted from the selected laser source 30 onto an object thereby creating a laser line. Then, the crown screw 82 of the selected laser source 30 is adjusted to eliminate any crowning in the laser line (e.g., removing any arc in the laser line such that it is straight). Adjustment of the crown screw 82 moves the lens holder 54 relative to the laser barrel 52 since the tabs 78 keep the lens holder 54 secured at a top of the lens holder 54.

Next, the roll screw 80 of the selected laser source 30 is used to adjust the laser line to a horizontal plane. Adjusting the roll screw 80 moves the vertical fin 70 and in turn the laser barrel 52 relative to the barrel holder 50. Once the selected laser source 30 has been adjusted using the crown screw 82 and the roll screw 80 to create a straight horizontal line, each of the other plurality of laser sources 30 are then similarly adjusted using the crown screw 82 and the roll screw 80. At this point the laser lines emitted from all of the laser sources 30 are straight and horizontal. However, each laser line may not be in alignment, or in the same plane, as the next.

Next, the pitch screws 48 for each laser source 30 are adjusted such that each of the laser lines emitted from the laser sources 30 are all on the same plane (e.g., each laser line is in alignment with one another) thereby forming a "laser plane". The laser plane should be straight and continuous, although not necessarily horizontal. Since the biasing members 50 bias an end of the laser sources 30 away from the top surfaces 46 of the laser decks 28, by adjusting the pitch screws 48 the laser sources 30 are forced to pivot about the ribs 64 and grooves 44 until such time that the laser sources 30 are planar with one another.

In order to bring the laser plane to a horizontal plane, the pendulum 26 is allowed to swing freely such that the shaft 32 of the pendulum 26 is completely vertical. The laser lines of the laser sources 30 are straight and in alignment with one another in the laser plane. However, the laser plane may not be horizontal. Balance screws 84, located on an end of the shaft 32, are adjusted to bring the laser plane to a horizontal plane. The balance screws 84 adjust the center of gravity of the pendulum 26 by moving the center of mass of the balance screws 84 closer or farther away from the shaft 32.

By using the above method, each of the plurality of laser sources 30 are brought into the same plane and then brought into the horizontal plane. At any point thereafter, the calibration method may be repeated in order to recalibrate the laser sources 30.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A laser calibration device comprising:
    a housing;
    a pendulum pivotally coupled to said housing and suspending downwards therefrom;
    a laser deck mounted to said pendulum;
    at least one laser for emitting a laser line, said laser pivotally mounted to said laser deck and having a laser barrel rotatable within a barrel holder and a laser lens pivotally coupled to said laser barrel;
    a first adjustment mechanism mounted between said laser deck and said laser for pivoting said laser with respect to said laser deck to adjust a pitch of said laser line;
    a second adjustment mechanism mounted between said barrel holder and said laser barrel to rotate said laser barrel with respect to said barrel holder to adjust a roll of said laser line;
    a third adjustment mechanism mounted between said laser barrel and said laser lens to pivot said laser lens with respect to said laser barrel to adjust a crowning of said laser line; and
    a fourth adjustment mechanism mounted to said pendulum for adjusting a center of gravity of said pendulum;
    wherein said first, second, third, and fourth adjustment mechanisms are used to make horizontal said laser line emitted from said laser.

2. A laser calibration device comprising:
    a housing;
    a pendulum pivotally coupled to said housing and suspending downwards therefrom;
    a laser deck mounted to said pendulum, said laser deck including a plurality of laser mounting structures; and
    a plurality of lasers each mounted to a respective one of said plurality of laser mounting structures, each of said plurality of lasers being pivotally and rotatably mounted to said laser deck.

3. The laser calibration device according to claim 2, wherein said plurality of lasers have a laser barrel rotatable within a barrel holder and a laser lens pivotally coupled to said laser barrel.

4. The laser calibration device according to claim 3, further comprising a roll adjustment mechanism associated with each of said plurality of lasers for rotating said laser barrels to adjust a roll of said laser line emanated therefrom.

5. The laser calibration device according to claim 4, wherein said roll adjustment mechanism is mounted between said barrel holder and said laser barrel.

6. The laser calibration device according to claim 3, further comprising a crowning adjustment mechanism associated with each of said plurality of lasers for adjusting a position of the laser lens for adjusting crowning of said laser line emanated therefrom.

7. The laser calibration device according to claim 6, wherein said crowning adjustment mechanism is mounted between said laser barrel and said laser lens.

8. The laser calibration device according to claim 3, further comprising a center of gravity adjustment mechanism mounted to said pendulum for adjusting a center of gravity of said pendulum.

9. The laser calibration device according to claim 8, wherein said center of gravity adjustment mechanism includes a plurality of balance screws threadedly engaging said pendulum.

10. The laser calibration device according to claim 2, further comprising a pitch adjustment mechanism associated with each of said plurality of lasers for pivoting said lasers to adjust a pitch of said laser line emanated therefrom.

11. The laser calibration device according to claim 10, wherein said pitch adjustment mechanism is mounted between said laser deck and said laser.

12. A method of calibrating a laser including a plurality of laser lights mounted to a laser deck that is mounted to a pendulum, each laser light including a pitch adjustment mechanism, a roll adjustment mechanism and a crowning adjustment mechanism, the method comprising:
    adjusting said crowning adjustment mechanism of a first one of said plurality of laser lights to eliminate any crowning in said first laser light;
    adjusting said roll adjusting mechanism of said first one of said plurality of laser lights to adjust the laser line to a horizontal line;
    adjusting said crowning adjustment mechanism and said roll adjustment mechanism of remaining ones of said plurality of laser lights so that laser lines emitted from all of said plurality of laser lights are straight and horizontal;
    adjusting said pitch adjustment mechanisms for each of said laser lights such that each of said laser lines emitted from said plurality of laser lights are all on a common plane.

13. The method according to claim 12, further comprising adjusting a center of gravity adjustment mechanism of said pendulum.

14. A laser calibration device comprising:
    a housing;
    a pendulum pivotally coupled to said housing and suspending downwards therefrom;
    a laser deck mounted to said pendulum; and
    at least one laser for emitting a laser line, said laser pivotally mounted to said laser deck and having a laser barrel rotatable within a barrel holder and a laser lens pivotally coupled to said laser barrel.

* * * * *